(12) United States Patent
Fairgrieve et al.

(10) Patent No.: US 9,387,857 B2
(45) Date of Patent: Jul. 12, 2016

(54) METHOD OF ADAPTIVE CRUISE CONTROL, ADAPTIVE CRUISE CONTROL SYSTEM AND VEHICLE INCORPORATING SUCH A SYSTEM

(71) Applicant: Jaguar Land Rover Limited, Coventry (GB)

(72) Inventors: Andrew Fairgrieve, Coventry (GB); James Kelly, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 14/385,860

(22) PCT Filed: Mar. 22, 2013

(86) PCT No.: PCT/EP2013/056083
§ 371 (c)(1),
(2) Date: Sep. 17, 2014

(87) PCT Pub. No.: WO2013/139966
PCT Pub. Date: Sep. 26, 2013

(65) Prior Publication Data
US 2015/0081189 A1 Mar. 19, 2015

(30) Foreign Application Priority Data
Mar. 22, 2012 (GB) .................................. 1205037.3

(51) Int. Cl.
*B60W 30/16* (2012.01)
*B60W 30/18* (2012.01)

(52) U.S. Cl.
CPC .......... *B60W 30/16* (2013.01); *B60K 2310/246* (2013.01); *B60K 2310/248* (2013.01);
(Continued)

(58) Field of Classification Search
CPC .......... B60W 30/16; B60W 30/18145; B60W 2540/18; B60W 2550/14; B60W 2550/141; B60W 2550/146; B60W 2550/30; B60W 2550/306; B60W 2550/308; B60W 2720/106; B60W 2750/308; B60K 2310/246; B60K 2310/248; B60K 2310/266
USPC ........................................................... 701/96
See application file for complete search history.

(56) References Cited

U.S. PATENT DOCUMENTS 5,454,442 A * 10/1995 Labuhn .............. B60K 31/0008
180/169
5,594,645 A * 1/1997 Nishimura ......... B60K 31/0008
180/169
(Continued)

FOREIGN PATENT DOCUMENTS

DE 102 54 421 A1 6/2004
DE 102 54 424 A1 6/2004
(Continued)

OTHER PUBLICATIONS
International Search Report, PCT/EP2013/056083, Mar. 22, 2013, 6 pages.
(Continued)

*Primary Examiner* — Mary Cheung
*Assistant Examiner* — Atul Trivedi
(74) *Attorney, Agent, or Firm* — Myers Bigel & Sibley

(57) ABSTRACT

A method of cruise control whereby a following vehicle can be caused to travel at a target speed, subject to maintaining a pre-determined distance from a leading vehicle in substantially straight travel, the method comprising: determining by means of measuring means a separation distance of the leading vehicle and following vehicle and maintaining the pre-determined separation distance from the leading vehicle; determining by means of deviation detection means a deviation of the leading vehicle from a substantially straight path and an instant location of the deviation; and preventing automatic acceleration of the following vehicle until reaching said instant location in dependence on the detection of a deviation.

20 Claims, 3 Drawing Sheets

(52) U.S. Cl.
CPC .... *B60K2310/266* (2013.01); *B60W 30/18145* (2013.01); *B60W 2540/18* (2013.01); *B60W 2550/14* (2013.01); *B60W 2550/141* (2013.01); *B60W 2550/146* (2013.01); *B60W 2550/30* (2013.01); *B60W 2550/306* (2013.01); *B60W 2550/308* (2013.01); *B60W 2720/106* (2013.01); *B60W 2750/308* (2013.01)

(56) References Cited

U.S. PATENT DOCUMENTS

| | | | | |
|---|---|---|---|---|
| 5,710,565 | A * | 1/1998 | Shirai | B60K 31/0008 340/903 |
| 6,233,516 | B1 | 5/2001 | Egawa | |
| 6,853,906 | B1 | 2/2005 | Michi et al. | |
| 7,162,361 | B2 * | 1/2007 | Heinrichs-Bartscher | B60W 31/0008 180/170 |
| 7,212,907 | B2 * | 5/2007 | Heinrichs-Bartscher | B60K 31/0008 701/93 |
| 2002/0165657 | A1 | 11/2002 | Winner et al. | |
| 2005/0159876 | A1 | 7/2005 | Sugano | |
| 2005/0216170 | A1 * | 9/2005 | Heinrichs-Bartscher | B60W 30/16 701/96 |
| 2005/0251323 | A1 * | 11/2005 | Heinrichs-Bartscher | B60W 31/0008 701/117 |
| 2007/0005218 | A1 * | 1/2007 | Ueyama | B60W 30/16 701/96 |
| 2007/0152804 | A1 * | 7/2007 | Breed | B60N 2/2863 340/435 |
| 2008/0150786 | A1 * | 6/2008 | Breed | B60N 2/2863 342/53 |
| 2008/0300766 | A1 * | 12/2008 | Kumabe | B60K 31/0075 701/98 |
| 2009/0040095 | A1 | 2/2009 | Ogawa | |
| 2009/0240398 | A1 * | 9/2009 | Nanami | B60W 40/04 701/41 |
| 2010/0198450 | A1 * | 8/2010 | Shin | B60W 30/16 701/31.4 |
| 2010/0198478 | A1 * | 8/2010 | Shin | B60W 10/06 701/96 |
| 2010/0280751 | A1 * | 11/2010 | Breed | G08G 1/161 701/414 |
| 2011/0169625 | A1 * | 7/2011 | James | B60Q 9/008 340/439 |
| 2013/0158830 | A1 * | 6/2013 | Kurumisawa | B60K 31/00 701/96 |
| 2014/0291480 | A1 * | 10/2014 | Bruder | G01C 3/06 250/206 |

FOREIGN PATENT DOCUMENTS

| | | | |
|---|---|---|---|
| EP | 0 798 150 | A2 | 10/1997 |
| EP | 0 928 714 | A2 | 7/1999 |
| EP | 1 245 428 | A2 | 10/2002 |
| GB | WO 2013139966 | A1 * | 9/2013 ........... B60W 30/16 |
| JP | H11-198676 | A | 7/1999 |
| JP | 2005-205980 | A | 8/2005 |
| JP | 2007-008298 | A | 1/2007 |
| JP | 2008-290665 | A | 12/2008 |
| JP | 2009-166559 | A | 7/2009 |
| JP | 2009-205980 | A | 9/2009 |
| JP | 2010-200481 | A | 9/2010 |

OTHER PUBLICATIONS

Combined Search and Examination Report, Application No. GB1205037.3, Jun. 26, 2012, 6 pages.
Notice of Reason(s) for Refusal, Japanese Application No. 2015-500946, Aug. 25, 2015, 8 pages.
Notice of Preliminary Rejection, Korean Patent Application No. 10-2014-7029143, Sep. 17, 2015, 16 pages.
Notice of Reasons for Refusal, Japanese Patent Application No. 2015-500946, Mar. 8, 2016, 6 pages.

* cited by examiner

METHOD OF ADAPTIVE CRUISE CONTROL, ADAPTIVE CRUISE CONTROL SYSTEM AND VEHICLE INCORPORATING SUCH A SYSTEM

RELATED APPLICATIONS

This application is a 35 U.S.C. §371 national of PTC Application No. PCT/EP2013/056083, filed on Mar. 22, 2013, which claims priority from Great Britain Patent Application No. 1205037.3, filed Mar. 22, 2012, the contents of which are Incorporated herein by reference in their entireties. The above-referenced PCT International Application was published in the English language as International Publication No. WO 2013/139966 A1 on Sep. 26,2013.

TECHNICAL FIELD

This invention relates to vehicle cruise control, and particularly, but not exclusively, to autonomous cruise control at low vehicle speeds.

BACKGROUND

Vehicle cruise control permits a vehicle driver to set a predetermined road speed regardless of gradient. Cruise control is generally enabled for highway driving only, typically at speeds greater than 30 kph.

Autonomous cruise control (also known as adaptive cruise control or ACC) relies on forward facing radar to permit a vehicle to follow another vehicle at a predetermined separation. The speed of the following vehicle is varied automatically with the speed of the leading vehicle, within certain pre-set speed and acceleration limits. Autonomous cruise control is typically used in highway driving where the frequency of interruption is small, and where speed variation is within a relatively narrow band.

Certain control strategies have been developed for autonomous cruise control at highway speeds. Thus a lead vehicle may disappear from view, for example owing to a bend in the road; in this circumstance the following vehicle will accelerate towards a pre-set upper speed limit until the leading vehicle again comes into view, whereupon the following vehicle reduces speed to maintain the desired separation distance. The rates of acceleration and of deceleration in cruise control mode are limited in order to ensure smooth response of the vehicle to changes in separation distance. Greater rates of deceleration may be provided in other automatic systems, such as collision avoidance systems, but these are not typically part of cruise control functionality.

It will be appreciated that control strategies suitable for autonomous cruise control in highway driving may not be suitable for urban use where vehicle speed may vary across the entire permitted range, where speed variation is frequent, and where the frequency of interruption is high.

Thus two vehicles. the following vehicle using autonomous cruise control, moving at a typical urban speed of 30 kph may approach a corner. The leading vehicle maintains speed but moves out of view of the following vehicle. In consequence the following vehicle accelerates to bring the leading vehicle back into view, but in doing so the following vehicle accelerates into the corner against driver expectation, which may be unnerving to the vehicle occupants.

It is against this background that the present invention has been conceived. Embodiments of the invention may provide a method or system of autonomous cruise control which is suitable for use in urban conditions. Other aims and advantages of the invention will become apparent from the following description, claims and drawings.

SUMMARY OF THE INVENTION

Embodiments of the invention may be understood with reference to the appended claims.

Aspects of the present invention provide an apparatus, a vehicle and a method.

In one aspect of the invention for which protection is sought there is provided a cruise control apparatus, a cruise control system, a vehicle and a method.

In an aspect of the invention for which protection is sought there is provided a method of cruise control whereby a following vehicle can be caused to travel at a target speed, subject to maintaining a pre-determined minimum separation distance from a leading vehicle in substantially straight travel, the method comprising:

determining by means of measuring means the separation distance of the leading vehicle and following vehicle and maintaining the pre-determined separation distance from the leading vehicle;

determining by means of deviation detection means a deviation of the leading vehicle from a substantially straight path and an instant location of the deviation; and preventing automatic acceleration of the following vehicle until reaching said instant location in dependence on the detection of a deviation.

It is to be understood that prevention of automatic acceleration has the effect that if the following vehicle is travelling at a speed below the target speed when the deviation is detected, the following vehicle is not permitted to accelerate automatically to a higher speed, such as the target speed. In some embodiments, when automatic acceleration has been prevented a driver of the vehicle may still intervene to override the cruise control system and cause the vehicle to accelerate by means of an accelerator pedal.

It is to be understood that embodiments of the present invention are only implemented where the target speed of the following vehicle is greater than the instant speed of the following vehicle.

Some embodiments of the present invention have the advantage that because deviation from a substantially straight path may be detected, in the event the leading vehicle is temporarily invisible due to a bend in a road and the following vehicle is in fact still following the leading vehicle, acceleration of the following vehicle is prevented and therefore the separation distance is maintained, assuming the speed of the leading vehicle does not change.

Optionally, preventing automatic acceleration to the target speed comprises causing the following vehicle to maintain the speed of the following vehicle until reaching the instant location of the deviation.

Reference to maintaining the speed of the following vehicle until reaching the instant location of the deviation may comprise maintaining the speed of the following vehicle at the moment the leading vehicle deviated from the substantially path. Other arrangements are also useful.

It is to be understood that the function of maintaining a pre-determined distance from the leading vehicle may be considered to be suspended if deviation of the leading vehicle from a substantially straight path is detected. Acceleration of the following vehicle to the target speed is prevented, and optionally the instant speed of the following vehicle is maintained, until reaching the instant location. Thus, autonomous cruise control functionality may be considered to be suspended, even though the method involves control of vehicle speed. In some embodiments the method may comprise not accelerating automatically the following vehicle to a speed above the speed of the target vehicle. Alternatively the method may comprise not accelerating the following vehicle above an instant speed of the following vehicle when deviation of the leading vehicle from the substantially straight path is detected.

Optionally, determining by means of deviation detection means a deviation of the leading vehicle from a substantially straight path and an instant location of the deviation, and in consequence preventing automatic acceleration of the following vehicle, comprises preventing automatic acceleration of the following vehicle if the deviation is less than a prescribed threshold.

Thus it is to be understood that a vehicle may be considered to be in substantially straight travel, and not deviating from a substantially straight path, if the deviation is less than a prescribed threshold. In some embodiments substantially straight travel may be defined as travel in which a steering angle is less than a prescribed value. The prescribed value may be dependent on speed; the prescribed value may be lower at higher speeds than at lower speeds. In some embodiments the prescribed value may be set in dependence at least in part on a width of a road on which the vehicle is travelling. Other arrangements are also useful.

Alternatively or in addition, in some embodiments deviation of the leading vehicle from substantially straight travel may be defined as deviation to the extent that the leading vehicle moves in a lateral and/or vertical direction with respect to the following vehicle to a sufficient extent that it becomes substantially invisible to the measuring means, i.e. the leading vehicle moves out of a range of detection of the following vehicle. It is to be understood that movement in a longitudinal direction ahead of the following vehicle whilst remaining within a prescribed lateral and/or vertical range ahead of the vehicle (until the leading vehicle becomes no long visible) may not be detected as a deviation from substantially straight travel.

It is to be understood that in some embodiments deviation may be considered to be movement out of a lateral range of the deviation detection means whilst in some embodiments, in addition or instead, deviation may be considered to be movement out of a vertical range of the deviation detection means.

The method may comprise determining whether the following vehicle deviates from a substantially straight path in a corresponding manner to the leading vehicle at said instant location.

The method may for example comprise detecting a vertical deviation, such as traversal of a hump in a road, or other vertical terrain feature.

Alternatively or in addition the method may comprise detecting a horizontal (lateral) deviation, for example due to negotiation of a bend in a road.

Advantageously, if the following vehicle deviates from a substantially straight path in a corresponding manner to the leading vehicle at the instant location the method may comprise preventing automatic acceleration to the target speed until the following vehicle has assumed travel in a substantially straight path.

Optionally if the following vehicle deviates from a substantially straight path in a corresponding manner to the leading vehicle at the instant location the method comprises preventing automatic acceleration to a speed above an instant speed of the following vehicle.

The method may comprise subsequently causing the following vehicle to resume maintaining a pre-determined separation distance from a leading vehicle in substantially straight travel.

It is to be understood that the method may comprise suspending maintenance of the pre-determined distance when a deviation of the leading vehicle from a substantially straight path is detected, for example a change of direction of the leading vehicle. Subsequently, if the following vehicle changes direction in a corresponding manner, the method may comprise resuming maintenance of the predetermined distance behind the leading vehicle. As described above, suspension of maintenance of the predetermined distance may be considered to correspond to suspension of autonomous cruise control, although a controller responsible for implementing autonomous cruise control may still remain in control of vehicle speed by causing the instant speed of the following vehicle when deviation of the leading vehicle is detected to be maintained until reaching the instant location. The controller may then resume (re-enable) autonomous cruise control in the manner described.

It is to be understood that upon resumption of maintaining the pre-determined distance from the leading vehicle, the leading vehicle may be a different vehicle or the same vehicle as the vehicle the following vehicle was previously following. For example, the leading vehicle being followed when the deviation was detected may have overtaken a vehicle ahead of it by the time the following vehicle has cornered, and therefore the following vehicle may now be following a different leading vehicle.

It is to be understood that if a user intervenes in vehicle control by depressing a brake control, cruise control may be disabled and re-enabled only if a user re-selects cruise control functionality.

Advantageously, if the following vehicle does not deviate from a substantially straight path in a corresponding manner to the leading vehicle at the instant location the method may comprise cancelling prevention of automatic acceleration.

Thus, in the absence of a leading vehicle, the following vehicle may accelerate to the target speed. If a leading vehicle is present, the following vehicle may maintain the pre-determined separation distance from the leading vehicle.

The method may comprise disabling autonomous cruise control and maintaining the speed of the following vehicle when a directional change of the leading vehicle is detected.

The method may comprise causing the following vehicle to travel at a target speed (or 'set-speed') in dependence on a separation distance of the leading and following vehicles. Thus, where conditions permit, the following vehicle cruise control system may be operable to cause the following vehicle to travel at the target speed. If a leading vehicle is detected and the leading vehicle is travelling at a lower speed, the following vehicle is caused to reduce speed so as to maintain a prescribed minimum separation distance.

Optionally, determining by the measuring means the separation distance comprises transmitting a signal from the following vehicle to the leading vehicle, and receiving at the following vehicle a reflection of said signal from a leading vehicle.

The signal may be in the form of an electromagnetic signal such as a radar signal or radar beam. The signal may be in the form of a series of pulses of electromagnetic radiation.

Alternatively or in addition, determining by the measuring means the separation distance may comprise determining the separation distance by reference to one or more images of the leading vehicle.

In some embodiments, in the case a plurality of images are employed the images may be in the form of successively captured images. Alternatively or in addition the images may be in the form of stereoscopic pairs. Other arrangements are also useful.

The measuring means may be arranged to provide the deviation detection means.

Thus, the method may comprise determining whether the leading vehicle changes direction by reference to a signal transmitted from the following vehicle and reflected by the leading vehicle. Alternatively or in addition the determination may be made by reference to one or more captured images.

The method may include determining a directional change of the leading vehicle in a substantially horizontal plane.

The method may include determining a directional change of the leading vehicle in a substantially vertical plane.

Thus the method may comprise detecting a vertical shuffle of the leading vehicle, for example due to negotiation of a road hump, a humped bridge, or commencement of ascent or descent of a hill or other change in direction having a component in a substantially vertical plane.

Optionally, if the following vehicle deviates from a substantially straight path in a corresponding manner to the leading vehicle at the instant location due to ascent or descent of an incline exceeding a first prescribed angle with respect to a substantially horizontal plane, the method comprises maintaining speed of the following vehicle until travel is established in a direction that is within a second prescribed angle of a substantially horizontal plane, whereby the second prescribed angle is less than the first.

The first prescribed angle may for example be in the range from 5 to 20 degrees above or below a horizontal plane. The second prescribed angle may be in the range from 1 to 10 degrees above or below a horizontal plane, further optionally from around 1 to 5 degrees provided that the second angle is less than the first. Other values of the first and second prescribed angles are also useful. An angle of a vehicle path with respect to a horizontal plane may be determined by reference to one or more sensors alone or in combination, such as an inclination sensor, attitude sensor or acceleration sensor.

Thus, in some embodiments if the following vehicle is negotiating a terrain having a relatively steep incline or gradient, suspension of automatic acceleration may be imposed until travel on substantially level terrain is resumed. It is to be understood that when negotiating relatively steep terrain, it is likely that the leading vehicle may subsequently encounter a change in gradient to a more shallow gradient, substantially level terrain or terrain sloping in substantially the opposite direction, and potentially become temporarily invisible to the following vehicle. Accordingly, an increased likelihood exists that the following vehicle will subsequently detect a change in direction of the leading vehicle requiring suspension of automatic acceleration. The following vehicle therefore maintains suspension of automatic acceleration whilst negotiating the gradient in anticipation of this subsequent change of direction of the leading vehicle.

The method may include setting the threshold in dependence upon the speed of travel of the following vehicle.

Said threshold may comprise an angular deviation.

Alternatively or in addition said threshold may comprise a rate of change of direction.

The method may include detecting an operating condition of the vehicle, and selecting the threshold accordingly.

Said operating condition may be indicative of the terrain over which the following vehicle is travelling.

The threshold for detection of a change of direction in a horizontal and/or vertical direction may for example be higher for travel in an operating condition indicative of relative rough terrain.

The operating condition may for example be a driving mode that is selected in dependence on the terrain over which the vehicle is travelling. The driving mode may be selected by a user or, in some embodiments, selected automatically by a control system.

Optionally, determining by means of measuring means a separation distance of the leading vehicle and following vehicle and determining by means of deviation detection means a deviation of the leading vehicle from a substantially straight path is performed repeatedly at a rate of 10 Hz or greater.

In one aspect of the invention for which protection is sought there is provided a cruise control system operable to cause a following vehicle to travel at a target speed subject to maintaining a pre-determined minimum separation distance from a leading vehicle in substantially straight travel, the system comprising:

measuring means for determining the separation distance of the leading vehicle and following vehicle, the system being operable to cause the following vehicle to maintain the pre-determined separation distance from the leading vehicle; and deviation detection means for detecting a deviation of the leading vehicle from a substantially straight path and an instant location of the deviation, the system being operable to prevent automatic acceleration of the following vehicle until reaching said instant location in dependence on the detection of a deviation.

The system may be operable to determine that a deviation has occurred if the deviation exceeds a prescribed threshold.

The system may be arranged wherein the prescribed threshold includes a prescribed turning threshold, the system being configured to detect turning of the leading vehicle by means of the deviation detection means and to maintain instant cruise control speed if turning is detected which exceeds the prescribed turning threshold.

Optionally, said turning threshold is dependent upon speed of the following vehicle.

Alternatively or in addition, said turning threshold may be dependent upon an operating condition of the following vehicle.

The system may be configured to detect a turning angle of said leading vehicle.

The system may be arranged to receive input signals indicative of steering angle and distance traveled, the system being configured wherein automatic acceleration of the following vehicle continues to be prevented if when the following vehicle reaches the instant location of the leading vehicle at which deviation of the leading vehicle was detected, steering angle of the following vehicle corresponds substantially to said turning angle of the leading vehicle when deviation of the leading vehicle was detected.

The system may be further configured wherein automatic acceleration of the following vehicle continues to be prevented if the steering angle of the following vehicle when the following vehicle reaches the instant location of the leading vehicle at which deviation of the leading vehicle was detected is substantially the same as the turning angle of the leading vehicle when deviation of the leading vehicle was detected.

Thus if the rate of change of direction of the leading vehicle at the instant location of the leading vehicle at which deviation of the leading vehicle was detected is substantially the same as that of the following vehicle when the following vehicle reaches that location, the system continues to prevent automatic acceleration of the vehicle.

The system may continue to prevent automatic acceleration until the following vehicle has resumed substantially straight travel.

The system may be configured to detect a rate of change of direction of said leading vehicle.

The system may be arranged to receive input signals indicative of rate of change of direction and distance traveled in respect of the following vehicle, the system being configured wherein automatic acceleration of the following vehicle continues to be prevented if when the following vehicle is substantially at the instant location of the leading vehicle at which deviation of the leading vehicle was detected, the rate of change of direction of the following vehicle is substantially the same as that of the leading vehicle when deviation of the leading vehicle was detected.

In a further aspect of the invention for which protection is sought there is provided a vehicle incorporating a cruise control system according to a preceding aspect.

In one aspect of the invention for which protection is sought there is provided a cruise control module for a vehicle, the module being adapted to detect a separation distance from a leading vehicle, wherein said module is further adapted to detect turning of a leading vehicle from reflection of a forward facing pulsing beam, and to maintain instant cruise control speed if turning is detected which exceeds a turning threshold.

In one aspect of the invention for which protection is sought there is provided a cruise control system operable to cause a following vehicle to maintain a pre-determined distance from a leading vehicle in substantially straight travel, the system comprising:
  measuring means for determining a separation distance of the leading vehicle and following vehicle, the system being operable to cause the following vehicle to maintain the pre-determined separation distance from the leading vehicle; and
  deviation detection means for detecting a deviation of the leading vehicle from a substantially straight path and an instant location thereof,
  the system being configured to prevent automatic acceleration of the following vehicle until reaching said instant location if the deviation exceeds a prescribed threshold.

A cruise control system operable to maintain a pre-determined distance from a leading vehicle may be referred to as a cruise control system having autonomous (or adaptive) cruise control functionality, or an adaptive cruise control system. This is because the system proactively detects the presence of a leading vehicle and adjusts speed to maintain the prescribed separation distance from the leading vehicle.

According to one aspect of the invention for which protection is sought, there is provided a method of cruise control whereby a following vehicle can maintain a pre-determined distance from a leading vehicle in substantially straight travel; the method comprising the steps of:
  determining from the following vehicle a deviation of the leading vehicle from the path of straight travel,
  and maintaining the instant speed of the following vehicle if said deviation exceeds a pre-determined threshold.

According to a further aspect of the invention for which protection is sought there is provided a method of cruise control whereby a following vehicle can maintain a pre-determined distance from a leading vehicle in substantially straight travel, the method comprising the steps of:
  transmitting an electromagnetic wave from the following vehicle to the leading vehicle;
  receiving from the following vehicle a reflection of said wave from a leading vehicle;
  continually determining from said reflection the separation distance of the leading vehicle and following vehicle;
  determining from said reflection a directional change of the leading vehicle and the instant location thereof, and in consequence disabling cruise control and maintaining the speed of the following vehicle until reaching said instant location;
  determining whether the following vehicle changes direction corresponding to the directional change of the leading vehicle at said instant location;
  if yes, maintaining speed of the following vehicle until assuming substantially straight travel, and then re-enabling cruise control; if no re-enabling cruise control.

In some non-limiting embodiments of the invention autonomous cruise control (ACC) of the following vehicle is suspended when deviation of the lead vehicle from a straight path is detected. The separation distance of the vehicles may be continually monitored in the cruise control module, so that it can be determined when the following vehicle has reached the location at which deviation of the lead vehicle occurred, for example by an odometer. During this phase the speed of the following vehicle is maintained (via normal cruise control functionality) notwithstanding that the lead vehicle may no longer be detectable by the cruise control system. When the following vehicle reaches the location at which deviation occurred, ACC functionality is re-enabled only if the following vehicle is not itself deviating from a straight path. Thus if for example the following vehicle follows the leading vehicle round a bend, ACC functionality remains disabled (or suspended) until the following vehicle is again on a straight path. As speed of the following vehicle is maintained until the following vehicle has resumed substantially straight path travel, acceleration of the following vehicle into a curve is prevented.

If however the following vehicle does not follow the leading vehicle, but remains on a substantially straight path, ACC functionality is re-enabled.

For the purpose of the present invention, 'deviation' is defined as a departure from a path of substantially straight travel, and may comprise any direction of deviation which is detectable from the following vehicle. In one example the leading vehicle may deviate by turning a corner, and in consequence cause ACC functionality to be temporarily disabled. In another example the leading vehicle may deviate if crossing a road hump; in this case a vertical shuffle of the vehicle body is detected, and in consequence ACC functionality is temporarily disabled.

A method according to an embodiment of the invention may include the step of setting a threshold to distinguish between travel in a substantially straight path, and a deviation therefrom. Such a threshold may for example define for the leading vehicle a permissible angular or vertical deviation per unit time for defining substantially straight line travel, or for defining a directional change appropriate for disabling ACC functionality. The threshold may vary according to, for example, vehicle speed and terrain roughness.

Typically autonomous cruise control functionality is facilitated by a forward facing transmitter of an electromagnetic wave, and a receiver of reflections of the wave. Such reflections can be processed to detect a directional change of a leading vehicle, and hence give an indication that the leading vehicle may move out of sight, and thus fail to give a reflection to the receiver of the following vehicle. One example is disclosed in U.S. Pat. No. 6,795,765, in which a target vehicle is tracked through a curve during operation of ACC. Techniques for processing reflections are well-known, for example from radar systems, and need not be further described here.

The threshold for the following vehicle may for example be determined from the output of accelerometers measuring lateral (g) of the following vehicle, or from a measure of steering angle thereof.

Determining when the following vehicle has reached the location of directional change of the leading vehicle is typically by using information from an odometer or equivalent. As an alternative, or a supplement, GPS information may be used to give an actual location rather than a location relative to the following vehicle.

Embodiments of the present invention may be implemented in a cruise control module of a vehicle having the usual inputs of vehicle speed, lead vehicle speed or relative speed and separation distance. Further inputs may indicate terrain type selected, transmission ratio and the like in order that the appropriate cruise control strategy is implemented.

According to a further aspect of the present invention, there is provided a vehicle incorporating such a module, or otherwise adapted to the method of the invention.

In one aspect of the invention for which protection is sought there is provided an autonomous cruise control (ACC) system for a vehicle that can detect turning of a leading vehicle before the leading vehicle passes out of a cruise control beam. If this is detected the ACC is disabled and speed of the following vehicle is maintained until the turning location of the leading vehicle is reached. If the following vehicle turns at the turning location, ACC remains disabled until the following vehicle is travelling in a straight line.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Embodiments of the invention will now be described, by way of example only, with reference to the accompanying drawings in which:—

DETAILED DESCRIPTION

Figure 1:
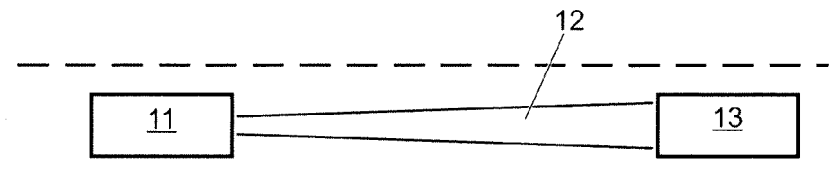
FIG. 1 illustrates straight line conventional autonomous cruise control (ACC)

With reference to the drawings, FIG. 1 illustrates a conventional autonomous cruise control system whereby a following vehicle 11 has a forward facing transmitter to generate a pulsing radar beam 12, which illuminates a leading car 13. Reflection of the radar beam 12 is detected at a receiver of the following car, and the time of flight calculated using known techniques. The speed of the following vehicle is known, and accordingly the separation distance of the vehicles can be calculated. The autonomous cruise control system is operable to allow a user to input a command to maintain a desired speed in the absence of slower moving traffic ahead. When the vehicle is travelling at the desired speed, the user presses a 'set speed' button and the vehicle is caused automatically to maintain the current speed.

It is to be understood that conventional autonomous cruise control systems differ from conventional cruise control systems in that conventional autonomous cruise control systems maintain the user set speed unless slower moving traffic is detected ahead, by means of the radar beam 12. If such traffic is detected, the systems use repeated calculation of separation distance between the following vehicle 11 and leading vehicle 13 by means of the radar beam 12 to maintain the following vehicle 11 at a defined separation. The defined separation may be selected according to the speed of travel; thus as speed increases, the separation distance may also increase. The maximum speed of the following vehicle 11 is limited to the user set speed. The feature of maintaining a defined minimum separation in the presence of slower moving traffic ahead may be referred to as autonomous cruise control functionality.

Figure 2:
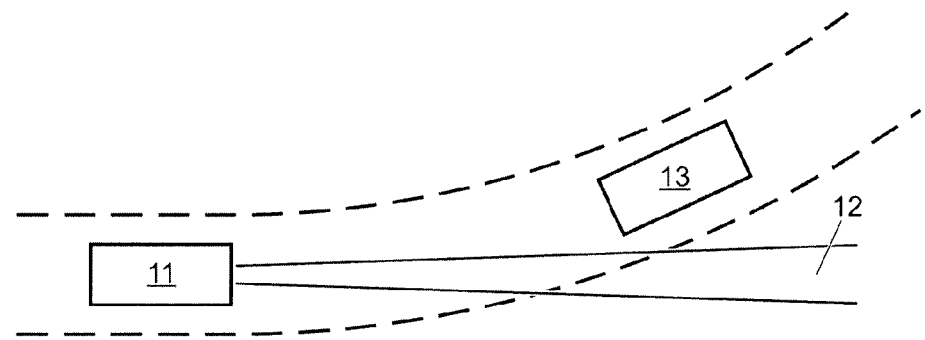
FIG. 2 illustrates the effect of a curve on conventional ACC.

FIG. 2 illustrates a relatively tight bend, in which the leading vehicle 13 has moved out of the beam 12. In consequence the following vehicle 11 increases speed, according to a known protocol, to re-acquire the leading vehicle 13, and the separation distance reduces as illustrated.

When the leading vehicle 13 is again detected by the beam 12, the speed of following vehicle 11 reduces until the desired separation distance is once again achieved. Rates of acceleration and deceleration may be prescribed to ensure comfort and safety of the occupants of the following vehicle 11.

Figure 3:
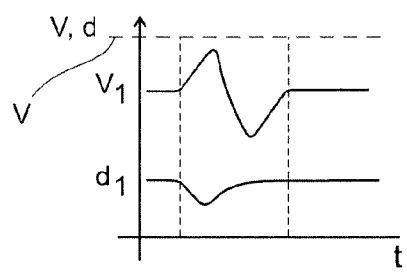
FIG. 3 is a characteristic of vehicle speed and separation distance during cornering with conventional ACC.

The effect is illustrated graphically in FIG. 3, assuming the speed of the leading vehicle 13 is unchanged as it negotiates the bend. As the leading vehicle 13 negotiates the bend, it becomes substantially invisible to the following vehicle 11. As a consequence, the following vehicle 11 accelerates to attain a speed set by the user being the speed the user desires to travel at in the absence of slower traffic ahead. This may be referred to as a user set speed.

Thus it can be seen from FIG. 3 that a speed V of the following vehicle 11 first increases (upper trace of FIG. 3) when the leading vehicle 13 is no longer detected.

As a consequence of the increase in speed above V1, a separation distance d of the vehicles 11, 13 decreases from prescribed value d1 that was maintained when the leading vehicle 13 was visible to the following vehicle 11.

When the leading vehicle 13 is again detected by the following vehicle 11, i.e. when the leading vehicle 13 is 're-acquired' by the beam transmitted from the following vehicle 11, speed V of the following vehicle 11 is decreased in order to re-establish the separation distance d at the prescribed value d1. For the purposes of this example, it is considered that the speed of the leading vehicle 13 does not change during this period.

It is desirable to provide an improved autonomous cruise control system.

Figure 4:
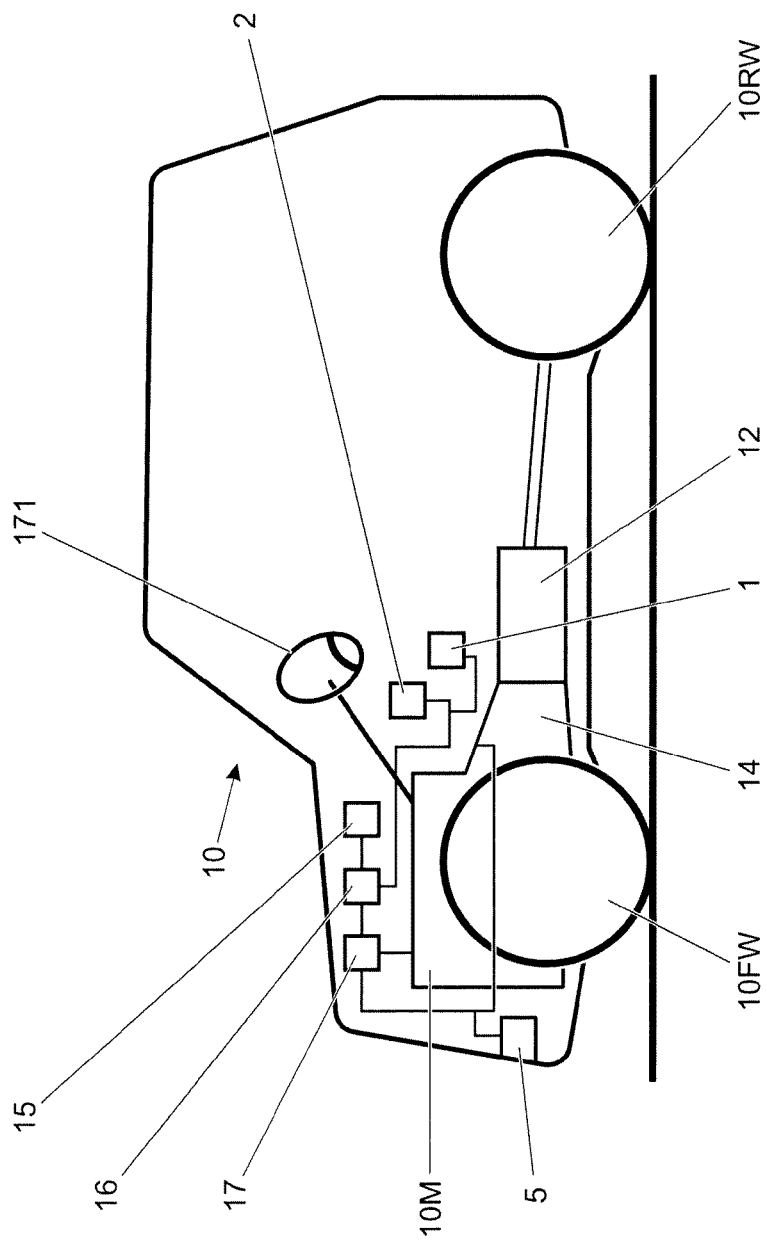
FIG. 4 is a schematic illustration of a vehicle according to an embodiment of the present invention.

FIG. 4 is a schematic illustration of a vehicle 10 according to an embodiment of the present invention. The vehicle 10 has a prime mover or motor 10M in the form of an internal combustion engine. The engine 10M is coupled to a transmission 12 by means of a coupling 14. The coupling 14 is arranged to allow the transmission 12 progressively to reach a speed compatible with motor speed when the vehicle 10 is accelerated from rest. The coupling 14 is typically a friction clutch, torque converter or the like. An accelerator pedal 1 allows a driver to control an amount of torque developed by the motor 10M under the control of a powertrain controller 17 whilst a brake pedal 2 allows a driver to apply a braking system under the control of a brake controller 16.

Figure 5:
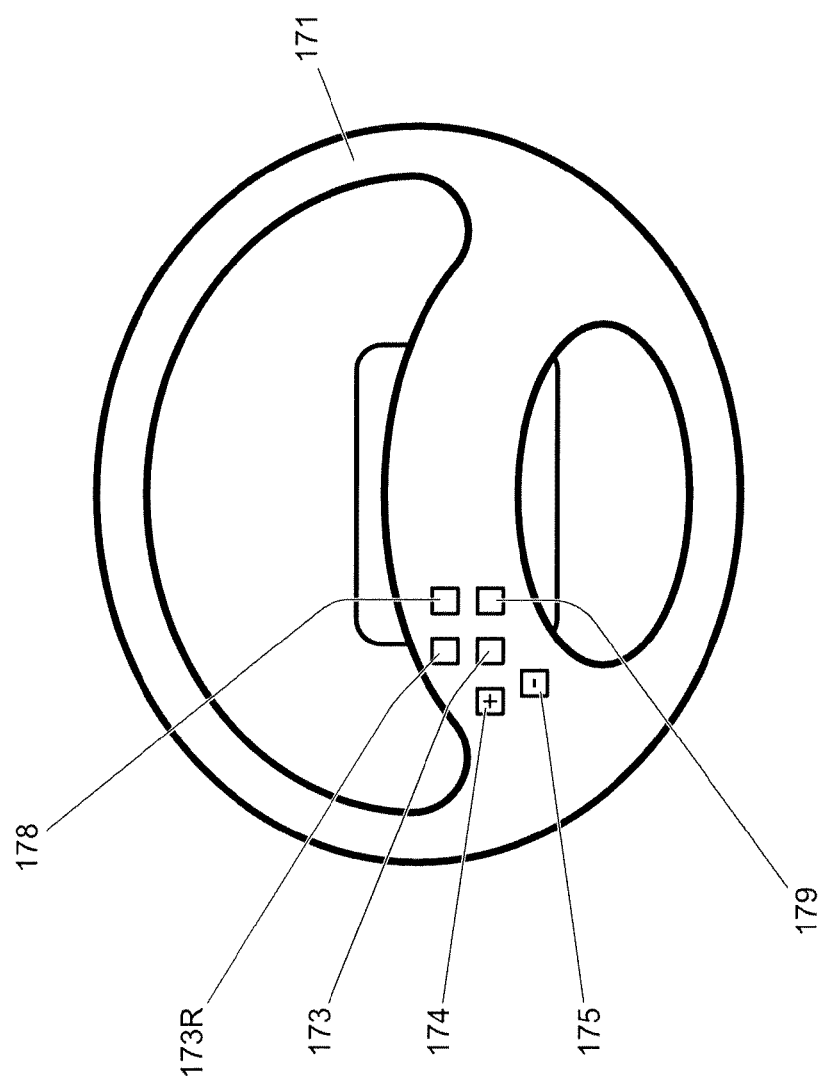
FIG. 5 is a schematic illustration of a steering wheel of a vehicle according to an embodiment of the present invention.

The vehicle 10 has a vehicle control unit (VCU) 15 that is operable to implement a vehicle speed control function similar to a conventional autonomous cruise control system but with additional functionality. The vehicle 10 may therefore be considered to include or implement an autonomous speed control (ACC) system. The speed control function or ACC system may be implemented at least in part by the VCU 15 in software code on a microprocessor that also implements additional vehicle functionality. Alternatively the speed control function may be implemented in a separate control module forming part of the VCU 15. The separate control module may be a dedicated module and be referred to as an autonomous cruise control module. The autonomous cruise control system is controlled by a user by means of input controls mounted to a steering wheel 171 of the vehicle 10. The steering wheel 171 is shown in more detail in FIG. 5.

The steering wheel 171 bears input controls allowing a user to control the autonomous cruise control system. The input controls include a 'set-speed' control 173, actuation of which sets the value of a parameter driver_set_speed to be substantially equal to the current vehicle speed. A resume button 173R allows a previously set value of set-speed to be selected if system operation has been interrupted, for example due to depression of brake pedal 2.

Depression of a '+' button 174 allows the set speed to be increased whilst depression of a '−' button 175 allows the set speed to be decreased. In some embodiments, if the speed control function is not active when the '+' button 174 is depressed, the speed control function is activated.

The wheel 171 also has a pair of following distance control buttons 178, 179 for setting a value of a parameter distance_following, being the distance the driver desires the vehicle 10 to maintain behind a leading vehicle. The VCU 15 is operable to control the vehicle 10 to maintain a distance behind a leading vehicle that is substantially equal to distance_following. A first of the buttons 178 is operable to increase the value of the parameter distance_following whilst a second of the buttons 179 is operable to decrease the value of the parameter distance_following.

The vehicle 10 has a radar module 5 mounted to a front thereof arranged to project a radar beam in a direction ahead of the vehicle 10. The module 5 is arranged to detect radiation reflected by a leading vehicle and to determine a distance of the leading vehicle from vehicle 10 (being a 'host' vehicle). The module 5 is provided with a signal indicative of a current speed of the host vehicle 10. From this signal and data in respect of a variation in distance of the leading vehicle from the host vehicle 10 as a function of time, the module 5 is able to calculate a speed of the leading vehicle. Other arrangements for determining distance of the leading vehicle from the host vehicle 10 and speed of the leading vehicle are also useful.

When the speed control function is activated, the VCU 15 controls the speed of the host vehicle 10 to be substantially equal to a driver set speed driver_set_speed. The driver may set the value of driver_set_speed by depressing the 'set speed' control 173 whilst the vehicle 10 is travelling at the desired speed. When the VCU 15 detects that the 'set speed' control 173 has been pressed, the VCU 15 takes a snapshot of the current speed of the vehicle 10 and sets the value of driver_set_speed to correspond to the current speed.

Thus, when the vehicle 10 is travelling along a road at a speed exceeding a minimum allowable set speed set_speed_min, the VCU 15 is operable to allow the user to command the VCU 15 to maintain the current vehicle speed by depressing set speed control 173. In the absence of traffic ahead of the vehicle 10, the VCU 15 causes the speed of the vehicle 10 to substantially match the set speed.

If the VCU 15 detects (by means of radar module 5) the presence of a leading vehicle ahead of the vehicle 10, the VCU 15 is operable to reduce the speed of the host vehicle 10 according to the speed of the leading vehicle 13 in order to maintain a distance behind the leading vehicle 13 that is substantially equal to a prescribed distance. The prescribed distance may be set by a driver by means of 'following distance' control buttons 178, 179.

As will be described in more detail below, when the vehicle 10 is following a leading vehicle 13 that is travelling at a speed less than the set speed of the vehicle 10, driver_set_speed, the VCU 15 is operable to cause the vehicle 10 to maintain the user prescribed distance distance_following behind the leading vehicle 13. The VCU 15 is operable in this situation to detect a deviation of the leading vehicle 13 from a substantially straight path. When the VCU 15 detects that the leading vehicle 13 has deviated from a substantially straight path by more than a prescribed amount, the autonomous cruise control system VCU 15 is configured to suspend maintenance of the prescribed distance behind the leading vehicle 13. This function may be referred to as suspension of the distance maintenance feature of the autonomous cruise control system. However, the autonomous cruise control system continues to control vehicle speed.

Instead of maintaining the prescribed distance behind the leading vehicle 13, the VCU 15 causes the vehicle 10 to remain at its current speed until the vehicle 10 reaches the location at which the leading vehicle 13 deviated from the substantially straight path. This has the advantage that, if the leading vehicle 13 subsequently becomes invisible to the following vehicle 10 as a consequence of negotiation of the bend, the following vehicle 10 is not caused by the VCU 15 to accelerate back to the driver set speed driver_set_speed, thereby reducing the separation distance of the leading and following vehicles 13, 10.

Figure 6:
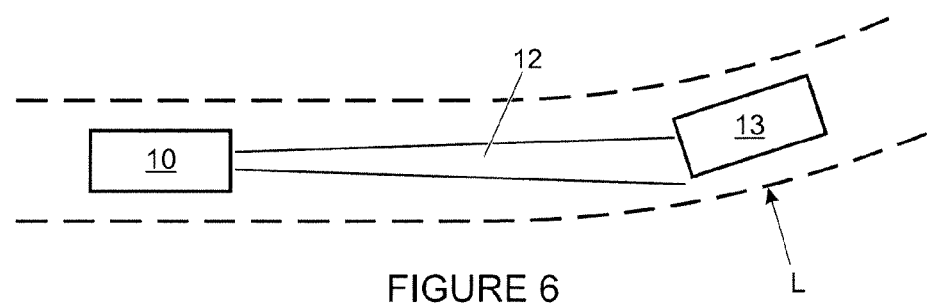
FIG. 6 illustrates operation of a vehicle according to an embodiment of the present invention.
Figure 7:
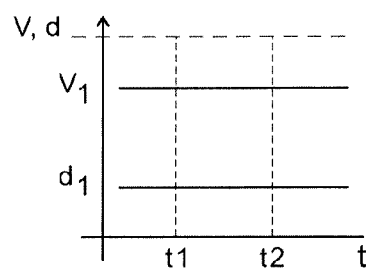
FIG. 7 corresponds to FIG. 3 and shows vehicle speed and separation distance during cornering in a vehicle according to an embodiment of the present invention.

Operation of the vehicle 10 of FIG. 4 is illustrated in FIG. 6. A leading vehicle 13 is shown negotiating an initial segment of a bend in a road. The following vehicle 10 is following the leading vehicle at a distance d1 and speed V1 as shown in FIG. 7, which corresponds to FIG. 3.

As the leading vehicle 13 turns, an amount of transmitted radar beam detected by the radar module 5 of vehicle 10 due to reflection from the leading vehicle 13 becomes irregular.

More specifically, the rear side of the leading vehicle 13 is no longer substantially perpendicular to the beam 12, and accordingly different times of flight are recorded for each radar pulse transmitted by the radar module 5 depending upon the reflection point. The turning angle and rate of turn of the leading vehicle 13 can be computed from this time of flight data by known techniques.

At a predetermined threshold of angular deviation of the leading vehicle 13 indicative of turning, the VCU 15 suspends (or disables) autonomous cruise control functionality (maintenance of the prescribed separation distance behind the leading vehicle, and in the absence of a leading vehicle, the driver set-speed) and the vehicle 10 is caused by the VCU 15 to maintain a steady speed pending the following vehicle 10 reaching the location L of the leading vehicle 13 at which the threshold of angular deviation was exceeded (as shown in FIG. 6). The distance to this location L is approximately the separation distance, which is known, being of value d1, see FIG. 7. The distance traveled by the following vehicle 10 is indicated by an odometer or the like. The vehicle 10 reaches location L at time t1 (FIG. 7).

In the present embodiment, when the following vehicle 10 reaches the location L, a check is made to determine if the following vehicle 10 is also turning. Such information is available from accelerometers, yaw rate sensors or a steering angle sensor of the following vehicle 10.

In a refinement, the following vehicle 10 may use the turning angle and/or rate of turn of the following vehicle 10 in order to confirm that it is substantially following the path of the leading vehicle around the bend.

If the following vehicle 10 is detected as turning, the VCU 15 causes the vehicle 10 to maintain the current speed, V1, until a straight ahead condition is indicated (again by reviewing accelerometer or steering angle signals) in which the vehicle 10 continues in a susbstantially straight path. Once a straight ahead condition is detected, at time t2, the VCU 15 causes the vehicle 10 to maintain the prescribed distance d1 behind the leading vehicle 13 and adjusts the speed V of the vehicle 10 accordingly. Thus, suspension (or disablement) of the distance maintenance feature of autonomous cruise control is lifted and distance maintenance is once again permitted and the vehicle is permitted to accelerate to the driver set-speed in the absence of a leading vehicle.

If the leading vehicle 13 has been travelling at a substantially steady speed it will be immediately re-acquired by the beam 12, and the following vehicle 10 will be at about the desired separation distance. In this case the speed V of the following vehicle 10 and separation distance d will be substantially unchanging, as represented by FIG. 7. Any variation of separation distance will be accommodated by the VCU 15 in a conventional fashion as soon as distance maintenance functionality of the autonomous cruise control system is re-enabled.

If the following vehicle 10 reaches location L and the turning check shows that it is travelling in a substantially straight path, distance maintenance functionality of the autonomous cruise control system implemented by the VCU 15 is immediately re-enabled. Such a circumstance would apply if the leading vehicle 13 had turned off a straight road, whereas the following vehicle 10 had continued without deviating.

Criteria may be pre-set for determining when the following vehicle 10 has reached the location L, which may also be referred to as a decision location L. In particular a time allowance may be included to ensure that the following vehicle 10 has reached or has just passed the decision location L. Furthermore the decision criteria may be used, at the decision location L, to make a check to confirm that the steering angle and/or rate of change of steering angle of the following vehicle 10 match the behaviour of the leading vehicle 13.

It is to be understood that the radar module 5 may be configured to transmit a radar beam in a pulsed manner. The pulse rate, and resultant determinations of relative (and/or actual) speed of the leading vehicle 13 and separation distance d may be carried out at a suitable refresh rate, typically greater than 10 Hz.

The example mentioned above is somewhat simplistic, but serves to illustrate the general nature of embodiments of the present invention. Similarly, the characteristics of FIG. 3 and FIG. 7 are illustrative only.

A cruise control system according to an embodiment of the present invention may be implemented in a cruise control module of a vehicle, which may form part of a vehicle control unit such as VCU 15 or be provided in the form of a separate controller. The system may be provided with input signals of vehicle behaviour from a vehicle controller area network (CAN) bus or any other suitable network bus. Suitable threshold values employed by the system may be retained in a look-up memory or the like, for example to relate separation distance and vehicle speed, and a processor may be programmed to implement a decision algorithm determining when maintenance of the prescribed distance behind the leading vehicle is to be enabled and when it is to be disabled. Suitable threshold values for detection of deviation of a leading vehicle from a substantially straight path may also be stored in the memory.

Other vehicle systems may continue to work in conjunction with the autonomous cruise control system, and may separately command disabling thereof; thus a collision avoidance system may take priority over the autonomous cruise control system in the event of certain circumstances being detected or may give direct control to the vehicle driver. Autonomous cruise control may be manually enabled and disabled by the vehicle driver.

Aspects and embodiments of the present invention described herein may also be used in conjunction with topographical information from, for example, a GPS system. In such an enhancement the following vehicle may predict that a leading vehicle will follow a curve in the road, and from information about the turning behaviour of the leading vehicle confirm that the leading vehicle is in fact following the road.

In the event that a leading vehicle does not follow a predicted path, for example by turning off the road, operation of the autonomous cruise control system in maintaining the prescribed separation distance may continue without being suspended (or disabled), so that acceleration up to the set speed may occur without delay.

It is to be considered that the value of set speed set by a user such as the driver may be considered to be a maximum allowable set speed because the system is configured to maintain this speed in the absence of slower moving traffic ahead of the following vehicle. In some embodiments absolute maximum allowable value of set speed may be imposed by the system, above which operation of the autonomous cruise control system is not permitted.

In some embodiments, the VCU 15 may be operable to detect vertical movement of the leading vehicle 10. When movement exceeding a threshold amount is detected, the VCU 15 may be operable to suspend maintenance of the prescribed distance behind the leading vehicle and to cause the host vehicle 10 to maintain current speed until reaching or passing (for example passing by a prescribed distance) the location of the leading vehicle at which vertical movement thereof exceeding the prescribed threshold was detected.

In some embodiments, if following vehicle 10 suspends acceleration due to vertical movement of the leading vehicle in order negotiate an incline, suspension of acceleration of the following vehicle may be imposed until the following vehicle 10 is again travelling in a substantially straight direction on substantially horizontal terrain. By substantially horizontal is meant terrain inclined by less than a prescribed amount with respect to a horizontal attitude. Other arrangements are also useful.

Embodiments of the present invention may be understood with reference to the following numbered paragraphs:

1. A method of cruise control whereby a following vehicle can be caused to travel at a target speed, subject to maintaining a pre-determined distance from a leading vehicle in substantially straight travel, the method comprising:
   determining by means of a measuring apparatus a separation distance of the leading vehicle and following vehicle and maintaining the pre-determined separation distance from the leading vehicle;
   determining by means of deviation detection apparatus a deviation of the leading vehicle from a substantially straight path and an instant location of the deviation; and
   preventing automatic acceleration of the following vehicle until reaching said instant location in dependence on the detection of a deviation.

The measuring apparatus may for example be arranged to project a pulsed beam of electromagnetic radiation in a direction ahead of the following vehicle and detected the distance of the leading vehicle from the following vehicle by measuring reflected radiation. Alternatively or in addition the apparatus may comprise one or more camera devices.

The measuring apparatus and deviation detection apparatus may be provided by the same apparatus. Thus the measuring apparatus may in addition to measuring the separation distance also determine deviation of the leading vehicle from a substantially straight path.

2. A method according to paragraph 1 wherein preventing automatic acceleration to the target speed comprises causing the following vehicle to maintain the speed of the following vehicle until reaching the instant location of the deviation.

3. A method according to paragraph 1 whereby determining by means of the deviation detection apparatus a deviation of the leading vehicle from a substantially straight path and an instant location of the deviation, and in consequence preventing automatic acceleration of the following vehicle, comprises preventing automatic acceleration of the following vehicle if the deviation is less than a prescribed threshold.

4. A method according to paragraph 1 comprising determining whether the following vehicle deviates from a substantially straight path in a corresponding manner to the leading vehicle at said instant location.

5. A method according to paragraph 1 whereby if the following vehicle deviates from a substantially straight path in a corresponding manner to the leading vehicle at the instant location the method comprises preventing automatic acceleration to the target speed until the following vehicle has assumed travel in a substantially straight path.

6. A method according to paragraph 1 whereby if the following vehicle deviates from a substantially straight path in a corresponding manner to the leading vehicle at the instant location the method comprises preventing automatic acceleration to a speed above an instant speed of the following vehicle.

7. A method according to paragraph 1 comprising subsequently causing the following vehicle to resume maintaining a pre-determined separation distance from a leading vehicle in substantially straight travel.

8. A method according to paragraph 1 wherein if the following vehicle does not deviate from a substantially straight path in a corresponding manner to the leading vehicle at the instant location the method comprises cancelling prevention of automatic acceleration.

9. A method according to paragraph 1 whereby determining by the measuring apparatus the separation distance comprises transmitting a signal from the following vehicle to the leading vehicle, and receiving at the following vehicle a reflection of said signal from the leading vehicle.

10. A method according to paragraph 1 whereby determining by the measuring apparatus the separation distance comprises determining the separation distance by reference to one or more images of the leading vehicle.

11. A method according to paragraph 1 whereby the measuring apparatus is arranged to provide the deviation detection apparatus.

12. A method according to paragraph 1, and including determining a directional change of the leading vehicle in a substantially horizontal plane.

13. A method according to paragraph 1, and including determining a directional change of the leading vehicle in a substantially vertical plane.

14. A method according to paragraph 13, comprising determining whether the following vehicle deviates from a substantially straight path in a corresponding manner to the leading vehicle at said instant location, whereby if the following vehicle deviates from a substantially straight path in a corresponding manner to the leading vehicle at the instant location due to ascent or descent of an incline exceeding a first prescribed angle with respect to a substantially horizontal plane, the method comprises maintaining speed of the following vehicle until travel within a second prescribed angle of a substantially horizontal plane is achieved, whereby the second prescribed angle is less than the first.

15. A method according to paragraph 3, including setting the threshold in dependence upon the speed of travel of the following vehicle.

16. A method according to paragraph 3, wherein said threshold comprises an angular deviation.

17. A method according to paragraph 3, wherein said threshold comprises a rate of change of direction.

18. A method according to paragraph 3, and including detecting an operating condition of the vehicle, and selecting the threshold accordingly.

19. A method according to paragraph 18, wherein said operating condition is indicative of the terrain on which the following vehicle is travelling.

20. A method according to paragraph 1 wherein determining by means of measuring apparatus a separation distance of the leading vehicle and following vehicle and determining by means of deviation detection apparatus a deviation of the leading vehicle from a substantially straight path is performed repeatedly at a rate of 10 Hz or greater.

21. An cruise control system operable to cause a following vehicle to travel at a target speed subject to maintaining a pre-determined distance from a leading vehicle in substantially straight travel, the system comprising:
   measuring apparatus for determining a separation distance of the leading vehicle and following vehicle, the system being operable to cause the following vehicle to maintain the pre-determined separation distance from the leading vehicle; and
   deviation detection apparatus for detecting a deviation of the leading vehicle from a substantially straight path and an instant location of the deviation, the system being operable to prevent automatic acceleration of the following vehicle until reaching said instant location in dependence on the detection of a deviation.

22. An system according to paragraph 21 operable to determine that a deviation has occurred if the deviation exceeds a prescribed threshold.

23. A system according to paragraph 22 wherein the prescribed threshold includes a prescribed turning threshold, the system being configured to detect turning of the leading vehicle by means of the deviation detection apparatus and to maintain instant cruise control speed if turning is detected which exceeds the prescribed turning threshold.

24. A cruise control system according to paragraph 23, wherein said turning threshold is dependent upon speed of the following vehicle.

25. A cruise control system according to paragraph 23, wherein said turning threshold is dependent upon an operating condition of the following vehicle.

26. A cruise control system according to paragraph 21 configured to detect a turning angle of said leading vehicle.

27. A cruise control system according to paragraph 26 arranged to receive input signals indicative of steering angle and distance traveled, the system being configured wherein automatic acceleration of the following vehicle continues to be prevented if when the following vehicle reaches the instant location of the leading vehicle at which deviation of the leading vehicle was detected, steering angle of the following vehicle corresponds substantially to said turning angle of the leading vehicle when deviation of the leading vehicle was detected.

28. A system according to paragraph 27 configured wherein automatic acceleration of the following vehicle continues to be prevented if the steering angle of the following vehicle when the following vehicle reaches the instant location of the leading vehicle at which deviation of the leading vehicle was detected, is substantially the same as the turning angle of the leading vehicle when deviation of the leading vehicle was detected.

29. A cruise control system according to paragraph 21, configured to detect a rate of change of direction of said leading vehicle.

30. A cruise control system according to paragraph 29 arranged to receive input signals indicative of rate of change of direction and distance traveled, the system being configured wherein automatic acceleration of the following vehicle continues to be prevented if when the following vehicle is substantially at the instant location of the leading vehicle at which deviation of the leading vehicle was detected, the rate of change of direction of the following vehicle is substantially the same as that of the leading vehicle when deviation of the leading vehicle was detected.

31. A vehicle incorporating a cruise control system according to paragraph 21.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of cruise control whereby a following vehicle can be caused to travel at a target speed, subject to maintaining a pre-determined distance from a leading vehicle in substantially straight travel, the method comprising:
    transmitting a signal from the following vehicle to the leading vehicle;
    receiving at the following vehicle a reflection of said signal from the leading vehicle;
    determining from said reflection of said signal from the leading vehicle via a measuring apparatus of the following vehicle, a separation distance of the leading vehicle and following vehicle and maintaining the pre-determined separation distance from the leading vehicle;
    determining from said reflection of said signal from the leading vehicle via a deviation detection apparatus of the following vehicle, a deviation of the leading vehicle from a substantially straight path and an instant location of the deviation of the leading vehicle from the substantially straight path; and
    preventing automatic acceleration of the following vehicle until reaching said instant location in dependence on the detection of a deviation.

2. The method of claim 1, wherein preventing automatic acceleration to the target speed comprises causing the following vehicle to maintain the speed of the following vehicle until reaching the instant location of the deviation.

3. The method of claim 1, whereby determining a deviation of the leading vehicle from a substantially straight path and an instant location of the deviation, and in consequence preventing automatic acceleration of the following vehicle, comprises preventing automatic acceleration of the following vehicle if the deviation is less than a prescribed threshold.

4. The method of claim 3, including setting the threshold in dependence upon the speed of travel of the following vehicle, said threshold comprising one of an angular deviation and a rate of change of direction.

5. The method of claim 3, and including detecting an operating condition indicative of the terrain on which the following vehicle is travelling, and selecting the threshold accordingly.

6. The method of claim 1, further comprising determining if the following vehicle deviates from a substantially straight path in a corresponding manner to the leading vehicle at the instant location, and if so, preventing one or more of: automatic acceleration to the target speed until the following vehicle has assumed travel in a substantially straight path and automatic acceleration to a speed above an instant speed of the following vehicle.

7. The method of claim 1, comprising subsequently causing the following vehicle to resume maintaining a pre-determined separation distance from a leading vehicle in substantially straight travel.

8. The method of claim 1, wherein if the following vehicle does not deviate from a substantially straight path in a corresponding manner to the leading vehicle at the instant location the method comprises cancelling prevention of automatic acceleration.

9. The method of claim 1, whereby the measuring apparatus is arranged to provide the deviation detection apparatus.

10. The method of claim 1, and including determining a directional change of the leading vehicle in at least one of a substantially horizontal plane and a substantially vertical plane.

11. The method of claim 10, comprising determining whether the following vehicle deviates from a substantially straight path in a corresponding manner to the leading vehicle at the instant location, wherein if the following vehicle deviates from a substantially straight path in a corresponding manner to the leading vehicle at the instant location due to ascent or descent of an incline exceeding a first prescribed angle with respect to a substantially horizontal plane, the method comprises maintaining speed of the following vehicle until travel within a second prescribed angle of a substantially horizontal plane is achieved, whereby the second prescribed angle is less than the first.

12. A cruise control system operable to cause a following vehicle to travel at a target speed subject to maintaining a pre-determined distance from a leading vehicle in substantially straight travel, the system comprising:
   a transmitter that transmits a signal from the following vehicle to the leading vehicle;
   a receiver that receives at the following vehicle a reflection of said signal from the leading vehicle;
   measuring apparatus for determining, from said reflection of said signal from the leading vehicle, a separation distance of the leading vehicle and following vehicle, the system being operable to cause the following vehicle to maintain the pre-determined separation distance from the leading vehicle; and
   deviation detection apparatus for detecting, from said reflection of said signal from the leading vehicle, a deviation of the leading vehicle from a substantially straight path and an instant location of the deviation of the leading vehicle from the substantially straight path, the system being operable to prevent automatic acceleration of the following vehicle until reaching said instant location in dependence on the detection of a deviation.

13. The system of claim 12, operable to determine that a deviation has occurred if the deviation exceeds a prescribed threshold.

14. The system of claim 13, wherein the prescribed threshold includes a prescribed turning threshold, the system being configured to detect turning of the leading vehicle by the deviation detection apparatus and to maintain instant cruise control speed if turning is detected which exceeds the prescribed turning threshold.

15. The cruise control system of claim 14, wherein said turning threshold is dependent upon one or more of speed of the following vehicle and an operating condition of the following vehicle.

16. The cruise control system of claim 12, configured to detect a turning angle of said leading vehicle.

17. The cruise control system of claim 16, arranged to receive input signals indicative of steering angle and distance travelled, the system being configured wherein automatic acceleration of the following vehicle continues to be prevented if when the following vehicle reaches the instant location of the leading vehicle at which deviation of the leading vehicle was detected, steering angle of the following vehicle corresponds substantially to said turning angle of the leading vehicle when deviation of the leading vehicle was detected.

18. The system of claim 17, configured wherein automatic acceleration of the following vehicle continues to be prevented if the steering angle of the following vehicle when the following vehicle reaches the instant location of the leading vehicle at which deviation of the leading vehicle was detected, is substantially the same as the turning angle of the leading vehicle when deviation of the leading vehicle was detected.

19. The cruise control system of claim 18, arranged to receive input signals indicative of rate of change of direction and distance travelled, the system being configured wherein automatic acceleration of the following vehicle continues to be prevented if when the following vehicle is substantially at the instant location of the leading vehicle at which deviation of the leading vehicle was detected, the rate of change of direction of the following vehicle is substantially the same as that of the leading vehicle when deviation of the leading vehicle was detected.

20. A vehicle comprising a cruise control system operable to cause the vehicle to travel at a target speed subject to maintaining a pre-determined distance from a leading vehicle in substantially straight travel, wherein the cruise control system comprises:
   a transmitter that transmits a signal from the vehicle to the leading vehicle;
   a receiver that receives at the vehicle a reflection of said signal from the leading vehicle;
   measuring apparatus for determining, from said reflection of said signal from the leading vehicle, a separation distance of the leading vehicle and the vehicle, the system being operable to cause the vehicle to maintain the pre-determined separation distance from the leading vehicle; and
   deviation detection apparatus for detecting, from said reflection of said signal from the leading vehicle, a deviation of the leading vehicle from a substantially straight path and an instant location of the deviation of the leading vehicle from the substantially straight path, the system being operable to prevent automatic acceleration of the vehicle until reaching said instant location in dependence on the detection of a deviation.

* * * * *